US011862122B2

(12) United States Patent
Tsai et al.

(10) Patent No.: US 11,862,122 B2
(45) Date of Patent: Jan. 2, 2024

(54) DISPLAY DEVICE

(71) Applicant: Innolux Corporation, Miao-Li County (TW)

(72) Inventors: Chia-Hao Tsai, Miao-Li County (TW); Ming-Jou Tai, Miao-Li County (TW); Yi-Shiuan Cherng, Miao-Li County (TW); Yu-Shih Tsou, Miao-Li County (TW); You-Cheng Lu, Miao-Li County (TW); Yung-Hsun Wu, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/752,866

(22) Filed: May 25, 2022

(65) Prior Publication Data

US 2022/0415275 A1 Dec. 29, 2022

(30) Foreign Application Priority Data

Jun. 24, 2021 (CN) ......................... 202110707051.8

(51) Int. Cl.
*G09G 3/36* (2006.01)
*G09G 3/20* (2006.01)

(52) U.S. Cl.
CPC ......... *G09G 3/3674* (2013.01); *G09G 3/2003* (2013.01); *G09G 3/2074* (2013.01);
(Continued)

(58) Field of Classification Search
None
See application file for complete search history.

(56) References Cited

U.S. PATENT DOCUMENTS

2006/0139308 A1* 6/2006 Jacobson ............... G09G 3/344
345/107
2015/0116375 A1* 4/2015 Yang .................... H10K 59/351
345/77

(Continued)

FOREIGN PATENT DOCUMENTS

CN 108810201 11/2018
CN 110767720 2/2020

(Continued)

OTHER PUBLICATIONS

"Office Action of Taiwan Counterpart Application", dated Jan. 16, 2023, p. 1-p. 4.

(Continued)

*Primary Examiner* — Andre L Matthews
(74) *Attorney, Agent, or Firm* — JCIPRNET

(57) ABSTRACT

The disclosure provides a display device and another display device. The display device includes a display panel. The display panel has a functional display area. The functional display area includes a pixel. The pixel includes a white pixel and multiple display pixels. The display pixels surround at least a part of the white pixel, and the white pixel includes a pixel electrode. The another display device includes another display panel. The another display panel has a functional display area, and the functional display area includes a pixel and a signal line. The pixel includes a white pixel and multiple display pixels. The signal line includes a branch, and the branch is electrically connected to one of the display pixels. The display device and the another display device of the disclosure is capable of reducing the problem of diffraction or having a better optical sensing effect.

15 Claims, 12 Drawing Sheets

(52) U.S. Cl.
CPC ............... *G09G 2300/0439* (2013.01); *G09G 2340/0407* (2013.01)

(56) References Cited

U.S. PATENT DOCUMENTS

| | | | | |
|---|---|---|---|---|
| 2016/0300891 | A1* | 10/2016 | Ren | H01L 27/3276 |
| 2019/0251895 | A1* | 8/2019 | Zhang | H10K 59/352 |
| 2021/0217372 | A1* | 7/2021 | Li | G09G 3/3648 |
| 2022/0173170 | A1* | 6/2022 | Yang | G09G 3/3208 |

FOREIGN PATENT DOCUMENTS

| | | |
|---|---|---|
| CN | 110914891 | 3/2020 |
| CN | 111929935 | 11/2020 |
| CN | 112233560 | 1/2021 |

OTHER PUBLICATIONS

"Office Action of Taiwan Counterpart Application", dated Jun. 20, 2023, p. 1-p. 5.

* cited by examiner

DISPLAY DEVICE

CROSS-REFERENCE TO RELATED APPLICATION

This application claims the priority benefit of China application serial no. 202110707051.8, filed on Jun. 24, 2021. The entirety of the above-mentioned patent application is hereby incorporated by reference herein and made a part of this specification.

BACKGROUND

Technical Field

The disclosure relates to a display device, and more particularly, to a display device capable of reducing the problem of diffraction or having a better optical sensing effect.

Description of Related Art

Display panels have been widely used in electronic devices such as mobile phones, televisions, monitors, tablet computers, automotive displays, wearable devices, and desktop computers. With the vigorous development of electronic products, the requirements for the display quality on the electronic products are getting higher and higher, so the electronic devices used for display are constantly improving towards display effects with larger or higher resolution.

SUMMARY

The disclosure provides a display device and another display device capable of reducing the problem of diffraction of light passing through the display device or having a better optical sensing effect.

According to an embodiment of the disclosure, the display device includes a display panel. The display panel has a functional display area. The functional display area includes a pixel. The pixel includes a white pixel and multiple display pixels. The display pixels surround at least a part of the white pixel. The white pixel includes a pixel electrode.

According to an embodiment of the disclosure, the another display device includes another display panel. The another display panel has a functional display area. The functional display area includes a pixel and a signal line. The pixel includes a white pixel and multiple display pixels. The signal line includes a branch. The branch is electrically connected to one of the display pixels.

BRIEF DESCRIPTION OF THE DRAWINGS

The accompanying drawings are included to provide a further understanding of the disclosure, and are incorporated in and constitute a part of this specification. The drawings illustrate embodiments of the disclosure, and together with the description serve to explain principles of the disclosure.

DESCRIPTION OF EMBODIMENTS

Figure 1A:
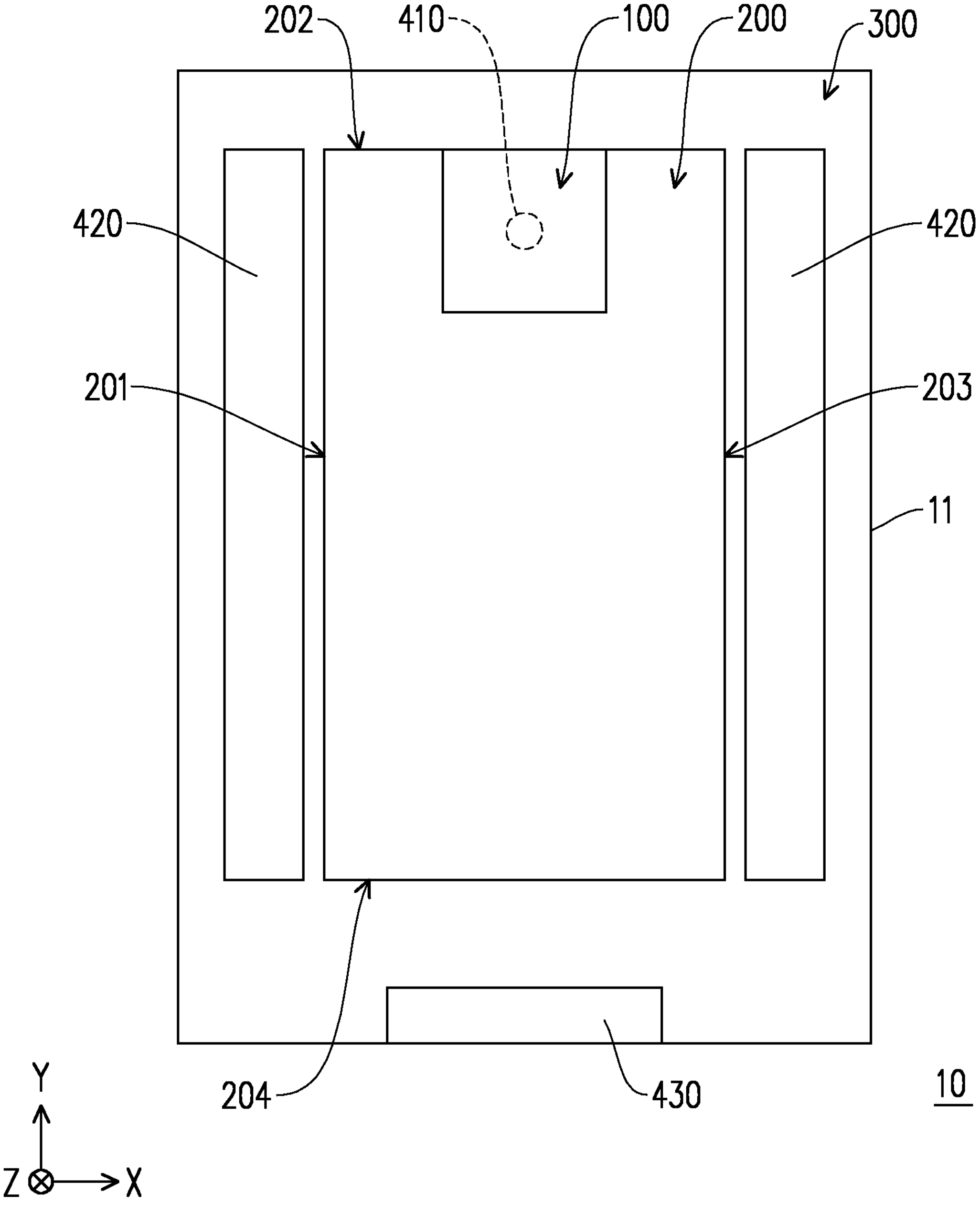
FIG. 1A is a schematic top view of a display device according to a first embodiment of the disclosure.

The disclosure can be understood with reference to the following detailed description in conjunction with the accompanying drawings. It should be noted that, for ease of understanding by readers and for the concision of the illustration, multiple drawings in the disclosure only depict a part of the display device, and certain elements in the drawings are not drawn according to actual scale. In addition, the number and size of each element in the drawings are for illustration only, and are not intended to limit the scope of the disclosure.

In the following description and claims, the words "comprising" and "including" are open-ended words, and thus should be interpreted as meaning "including but not limited to."

It will be understood that when an element or layer is referred to as being "on" or "connected to" another element or layer, it may be directly on or directly connected to another element or layer, or there may be an intervening element or layer in between (being indirectly on or connected to another element or layer). In contrast, when an element is referred to as being "directly on" or "directly connected to" another element or layer, there is not any intervening element or layer in between.

Although the terms "first," "second," "third" and the like may be used to describe various composing elements, the composing elements are not limited by the terms. Such a term is only used to distinguish a single composing element from another composing elements in the specification. The same terms may not be used in the claims, and may be replaced by first, second, third and the like in the order in which the elements are recited in the claims. Therefore, in the following description, a first composing element may be a second composing element in the claims.

In the description, the term "substantially" usually means within 10%, or within 5%, or within 3%, or within 2%, or within 1%, or within 0.5% of a given value or range.

In some embodiments of the disclosure, terms related to bonding and connection, such as "connection," "interconnection," and the like, unless otherwise specified, may mean that two structures are in direct contact, or may also mean that two structures are not in direct contact, in which there are other structures provided between these two structures.

And the terms related to bonding and connection may also include the case where both structures are movable, or both structures are fixed. Furthermore, the term "coupled" includes any direct and indirect method of electrical connection.

In the disclosure, the length, width, thickness, height or area, or the distance or spacing between elements may be measured by using an optical microscope (OM), a scanning electron microscope (SEM), a surface profiler (α-step), an ellipsometer, or other suitable measurement methods; in detail, according to some embodiments, a scanning electron microscope may be used to obtain a cross-sectional structure image including the element to be measured, and measure the width, thickness, height or area of each element, or the distance or spacing between elements, but the disclosure is not limited thereto. In addition, any two values or directions used for comparison may have certain errors.

The electronic device of the disclosure may include a display device, an antenna device (such as a liquid crystal antenna), a sensing device, a light emitting device, a touch control device, or a splicing device, but the disclosure is not limited thereto. The electronic device may include bendable and flexible electronic devices. The shape of the electronic device may be rectangular, circular, polygonal, a shape with curved edges, or other suitable shapes. The electronic device may include, for example, light emitting diodes (LEDs), liquid crystal, fluorescence, phosphor, quantum dots (QDs), other suitable display medium or a combination of the above, but the disclosure is not limited thereto. Light emitting diodes may include, for example, organic light emitting diodes (OLEDs), inorganic light emitting diodes, mini LEDs, micro LEDs, or quantum dot light emitting diodes (QLED or QDLED), other suitable materials or any combination of the above, but the disclosure is not limited thereto. The display device may also include, for example, a splicing display device, but is not limited to. The antenna device may be, for example, a liquid crystal antenna, but the disclosure is not limited thereto. The antenna device may include, for example, an antenna splicing device, but the disclosure is not limited thereto. It should be noted that the electronic device may be any arrangement or combination of the foregoing, but the disclosure is not limited thereto. In addition, the shape of the electronic device may be rectangular, circular, polygonal, a shape with curved edges, or other suitable shapes. The electronic device may have peripheral systems such as a driving system, a control system, and a light source system to support a display device, an antenna device or a splicing device. Hereinafter, the disclosure will be described with a display device, but the disclosure is not limited thereto.

It should be noted that, in the following embodiments, features in several different embodiments may be replaced, recombined, and mixed to complete other embodiments without departing from the spirit of the disclosure. As long as the features of the various embodiments do not depart from the spirit of the invention or conflict with each other, they may be mixed and matched as desired.

Reference will now be made in detail to the exemplary embodiments of the disclosure, examples of which are illustrated in the accompanying drawings. Wherever possible, the same reference numerals are used in the drawings and description to refer to the same or similar parts.

Figure 1B:
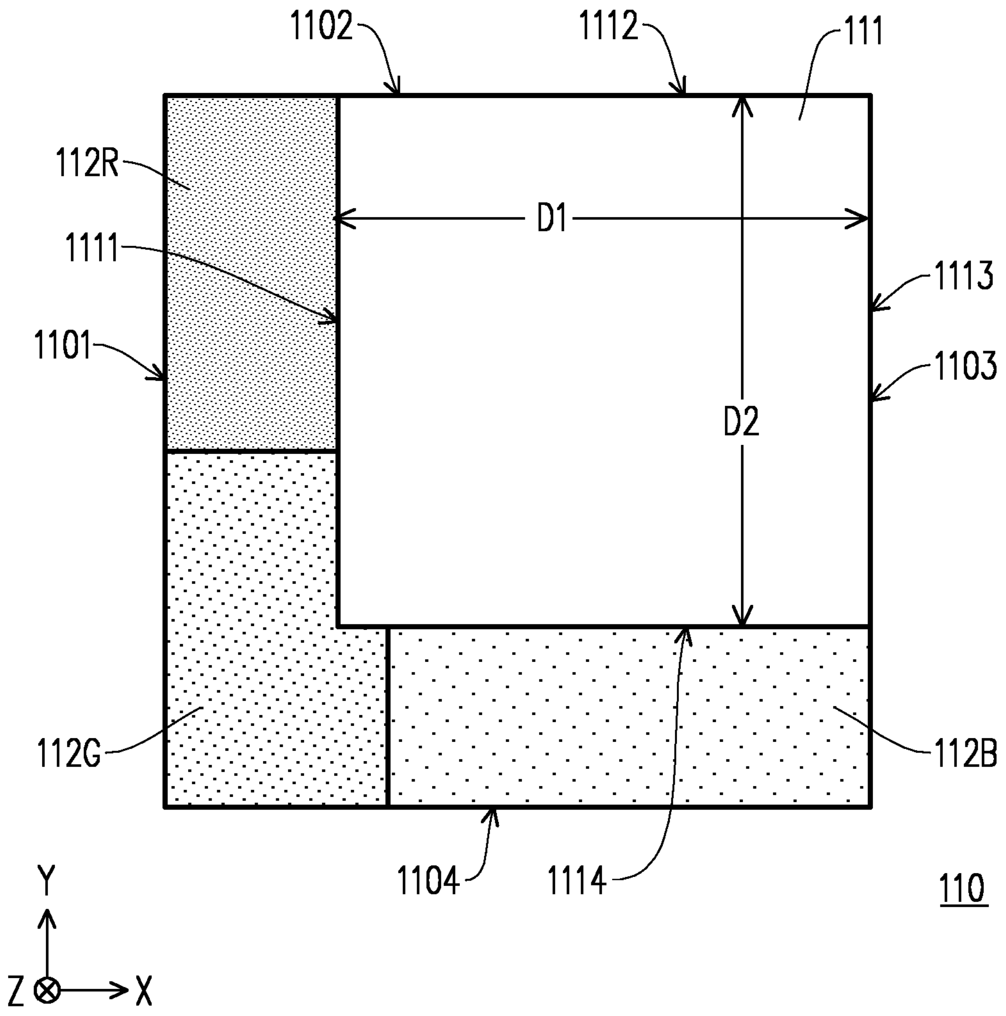
FIG. 1B is a schematic top view of a pixel of a functional display area in the display device of FIG. 1A.

FIG. 1A is a schematic top view of a display device according to a first embodiment of the disclosure. A display device 10 includes a display panel 11. FIG. 1B is a schematic top view of a pixel of a functional display area in the display panel of FIG. 1A. With reference to FIG. 1A, the display panel 11 of this embodiment has a functional display area 100, a general display area 200 and a non-display area 300. The general display area 200 is adjacent to the functional display area 100 and the non-display area 300, and the general display area 200 is disposed between the functional display area 100 and the non-display area 300, but the disclosure is not limited thereto. In some embodiments, the general display area 200 may, for example, surround at least part of the functional display area 100, and the non-display area 300 may, for example, surround the general display area 200, but the disclosure is not limited thereto. That is to say, in other embodiments, the functional display area 100, the general display area 200, and the non-display area 300 of the display device 10 may adopt other configurations as required. The shape of the functional display area in this embodiment is only an example, and in other embodiments, it may be adjusted according to actual design requirements, and the disclosure is not limited thereto.

In this embodiment, the general display area 200 has a first side 201, a second side 202, a third side 203 and a fourth side 204. The first side 201 and the third side 203 are opposite to each other, and the second side 202 and the fourth side 204 are opposite to each other. The second side 202 connects the first side 201 and the third side 203, and the fourth side 204 connects the first side 201 and the third side 203. In addition, in this embodiment, a first direction X, a second direction Y and a third direction Z are respectively different directions. The first direction X is, for example, the extending direction of the second side 202 and the fourth side 204. The second direction Y is, for example, the extending direction of the first side 201 and the third side 203. The first direction X is, for example, perpendicular to the second direction Y, and the third direction Z is, for example, perpendicular to the first direction X and the second direction Y However, the disclosure is not limited to the above.

In this embodiment, the display panel 11 further includes multiple gate on panel (GOP) drivers 420 and outer pin bonding areas 430, and the outer pin bonding area 430 may include driver chips and/or be used for bonding with external lines, but the disclosure is not limited thereto. The GOP circuit 420 and the outer pin bonding area 430 may be disposed corresponding to the non-display area 300. The GOP driver 420 may be disposed outside the first side 201 and the third side 203 of the general display area 200, and the outer pin bonding area 430 may be disposed outside the fourth side 204 of the general display area 200. In some embodiments, the display device 10 further includes an optical sensor 410. The optical sensor 410 may be correspondingly disposed in the functional display area 100 and may be disposed under the display panel 11 to provide functions such as photography, video recording, or biometric identification (such as fingerprint identification). The optical sensor 410 may include an optical camera or an infrared sensor. In other embodiments, the optical sensor 410 further includes a flash light, an infrared (IR) light source, other sensors, electronic components, or a combination thereof, but the disclosure is not limited thereto. In some embodiments, the area of the functional display area 100 may be larger than the area of the optical sensor 410 when viewed in a top view direction (for example, along the third direction Z), but the disclosure is not limited thereto.

Please refer to FIG. 1A and FIG. 1B simultaneously. In this embodiment, the functional display area 100 includes multiple pixels 110. At least a part of the pixels 110 include a white pixel 111 and multiple display pixels (for example, including a display pixel 112R, a display pixel 112G, and a display pixel 112B). The pixel 110 may have an edge 1101, an edge 1102, an edge 1103, and an edge 1104. The edge 1101 and the edge 1103 are opposite to each other, and the edge 1102 and the edge 1104 are opposite to each other. The edge 1102 connects the edge 1101 and the edge 1103, and the edge 1104 connects the edge 1101 and the edge 1103. In the disclosure, the functional display area 100 is an area defined by the pixels 110 including the white pixel 111 and multiple display pixels 112R, 112G and 112B.

In this embodiment, the white pixel 111 may be regarded as a light transmitting area, so that the outside light may penetrate the white pixel 111 and reach the optical sensor 410 when the optical sensor 410 is in the sensing mode (for example, when the optical sensor 410 is sensing and/or acquiring images of the outside world). The white pixel 111 may include a pixel electrode (not shown) and a part of a common electrode (not shown), and the pixel transmittance may be adjusted by the voltage supplied to the pixel electrode. In this way, when the functional display area 100 is displaying an image, by adjusting the voltage of the pixel electrode of the white pixel 111, the white pixel 111 may be opaque or non-display, thereby improving the display quality. In this embodiment, the transmittance of the functional display area 100 when the optical sensor 410 is in the sensing mode may be, for example, greater than the transmittance of the functional display area 100 when the optical sensor 410 is in the non-sensing mode, so that the user cannot see the optical sensor 410 through the display device 10 when the optical sensor 410 is in the non-sensing mode. For example, the transmittance in the disclosure refers to the percentage the light intensity of the transmitted light measured after the ambient light penetrates the display panel 11 (for example, the functional display area 100 of the display panel 11) divided by the light intensity of the ambient light not penetrating the display panel 11. The “light intensity” mentioned above refers to the spectral integral value of the light source (for example, display light or ambient light). In some embodiments, the light source may include visible light (for example, wavelengths between 380 nm and 780 nm) or ultraviolet light (for example, wavelengths less than 365 nm), but the disclosure is not limited thereto. That is, when the light source is visible light, the light intensity is the spectral integral value of wavelengths in the range of 380 nm to 780 nm.

In this embodiment, the display pixel 112R may display a red image, and the display pixel 112G may display a green image, and the display pixel 112B may display a blue image, so that the functional display area 100 may display an image when the optical sensor 410 is in the non-sensing mode, but the disclosure is not limited thereto. In the disclosure, a “pixel” may be a stacked structure that includes all relevant layers, relevant components, or relevant parts configured to emit light with brightness and color. For a liquid crystal display, a pixel may include relevant parts of the liquid crystal layer, relevant parts of the polarizer, relevant parts of the backlight, and the relevant substrate, driving circuit and color filter. For self-luminous displays (such as inorganic light emitting diode (LED) displays and organic light emitting diode (OLED) displays), a pixel may include relevant self-luminous sources, relevant light conversion layers, relevant parts of the polarizer, the relevant substrate and the relevant driving circuit. In other embodiments, when the general display area 200 and the functional display area 100 are displaying images, the white pixel 111 in the functional display area 100 may be turned off, that is, the white pixel 111 does not display an image or displays a black image.

In this embodiment, the multiple display pixels 112R, 112G and 112B may surround at least a part of the white pixel 111. Specifically, in this embodiment, the shape of the white pixel 111 is, for example, a square, but the disclosure is not limited thereto. The white pixel 111 may have a first side 1111, a second side 1112, a third side 1113 and a fourth side 1114. The first side 1111 and the third side 1113 are opposite to each other, and the second side 1112 and the fourth side 1114 are opposite to each other. The second side 1112 connects the first side 1111 and the third side 1113, and the fourth side 1114 connects the first side 1111 and the third side 1113. The first side 1111, the second side 1112, the third side 1113 and the fourth side 1114 of the white pixel 111 may all be straight lines, but the disclosure is not limited thereto. In addition, in this embodiment, the multiple display pixels 112R, 112G and 112B may be arranged in sequence and surround any two adjacent sides of the white pixel 111 (for example, the first side 1111 and the fourth side 1114), but the disclosure is not limited thereto. In some embodiments, the display pixel 112R, the display pixel 112G, and the display pixel 112B may be arranged in other orders (or irregularly arranged) and surround any two adjacent sides of the white pixel 111. In this embodiment, the white pixel 111 is, for example, disposed at one corner of the pixel 110. For example, the first side 1111, the second side 1112, the third side 1113 and the fourth side 1114 of the white pixel 111 may be, for example, the edges of the pixel electrode of the white pixel 111. In other embodiments, these edges may be, for example, the edges of an opening of a black matrix, and the opening may expose at least a part of the pixel electrode of the white pixel, but the disclosure is not limited thereto.

In this embodiment, there is a distance D1 between the first side 1111 and the third side 1113, and there is a distance D2 between the second side 1112 and the fourth side 1114. The distance D1 may be, for example, substantially equal to the distance D2, but the disclosure is not limited thereto. The distance D1 is, for example, the maximum distance measured along the first direction X between the first side 1111 and the third side 1113, and the distance D2 is, for example, the maximum distance measured along the second direction Y between the second side 1112 and the fourth side 1114. In this embodiment, since the distance D1 between the first side 1111 and the third side 1113 of the white pixel 111 (that is, the maximum length of the white pixel 111 in the first direction X) may be substantially equal to the distance D2 between the second side 1112 and the fourth side 1114 of the white pixel 111 (that is, the maximum length of the white pixel 111 in the second direction Y), the positions of the diffracted rays may be the same or the problem of serious diffraction in one direction may be reduced, which makes it easier for the software to correct the diffraction phenomenon caused by the light passing through the panel, so a better optical sensing effect may be obtained.

In some embodiments, the difference in aperture among the display pixels 112R, 112G and 112B may be, for example, less than 1% to reduce the problem of white point shift, but the disclosure is not limited thereto.

In this embodiment, the edges 1101, 1102, 1103 and 1104 of the pixel 110 and the edges of the white pixel 111 (that is, the first side 1111, the second side 1112, the third side 1113 and the fourth side 1114) are all straight lines; however, the disclosure does not limit the line forms of these edges. For example, in some embodiments, the edges 1101, 1102, 1103 and 1104 of the pixel 110 and the edges of the white pixel 111 (that is, the first side 1111, the second side 1112, the third side 1113 and the fourth side 1114) may be arcs, as shown in FIG. 2A and FIG. 2B.

In this embodiment, although the shape of the white pixel 111 is a square, the disclosure does not limit the shape of the white pixel 111. For example, in some embodiments, the shape of the white pixel 111 may be an octagon (not shown) or other polygons (not shown), as long as the distance D1 may be substantially equal to the distance D2 of the white pixel 111. In some embodiments, the shape of the white pixel 111 may be a circle (not shown).

Other examples are described below for illustration. It should be noted here that the following embodiments use the reference numerals and part of the contents of the previous embodiments, and the same reference numerals are used to designate the same or similar elements, and the description of the same technical contents is omitted. For the description of the omitted part, reference may be made to the foregoing embodiments, which will not be repeated in the following embodiments.

Figure 2A:
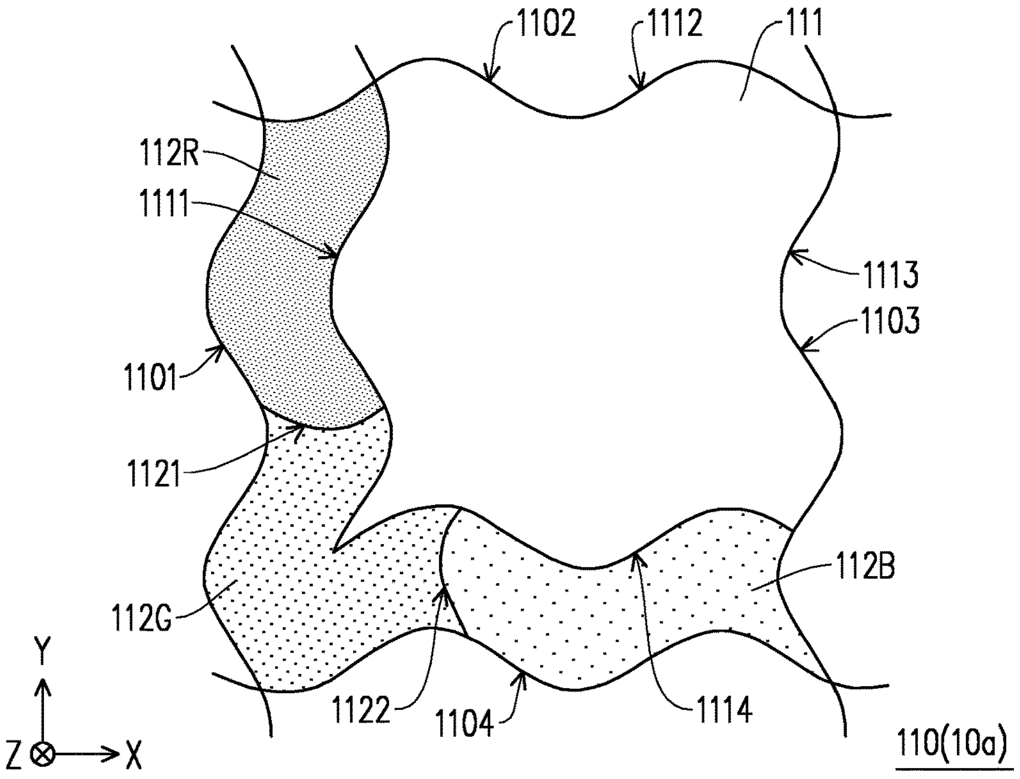
FIG. 2A is a schematic partial top view of a display device according to another embodiment of the disclosure.
Figure 2B:
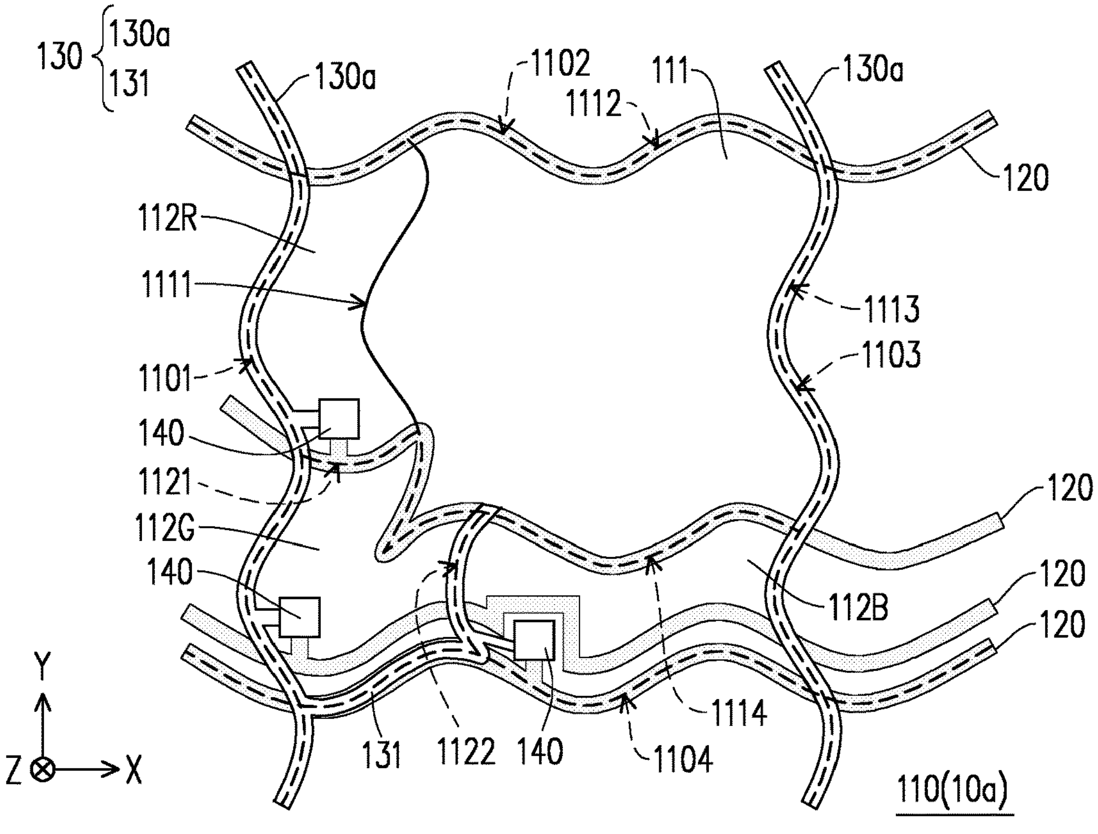
FIG. 2B is a schematic view of a circuit configuration of the display device of FIG. 2A.

FIG. 2A is a schematic partial top view of a display device according to another embodiment of the disclosure. FIG. 2B is a schematic view of a circuit configuration of the display device of FIG. 2A. Please refer to FIGS. 1B, 2A and 2B at the same time. The display device 10*a* of this embodiment is substantially similar to the display device 10 of FIG. 1B, so the same and similar components in the two embodiments will not be repeated here. The display device 10*a* of this embodiment is different from the display device 10 mainly in that, in the display device 10*a* of this embodiment, the line form of the pixel 110 is designed as an arc, so as to further reduce the diffraction of light in the first direction X and the second direction Y.

Specifically, please refer to FIGS. 2A and 2B at the same time. In this embodiment, the edges 1101, 1102, 1103 and 1104 of the pixel 110, the first side 1111, the second side 1112, the third side 1113 and the fourth side 1114 of the white pixel 111, and the boundaries between the multiple display pixels 112R, 112G and 112B (that is, a boundary 1121 between the display pixel 112R and the display pixel 112G, and a boundary 1122 between the display pixel 112G and the display pixel 112B) are all arcs.

With reference to FIG. 2B, in this embodiment, the functional display area 100 further includes a signal line 120, a signal line 130, a transistor 140 and a light shielding layer (not shown). The signal line 120 and the signal line 130 may be electrically connected to the transistor 140, respectively, and the light shielding layer may be used to shield the signal line 120, the signal line 130 and the transistor 140. For example, as shown in FIG. 2B, four signal lines 120, two signal lines 130 and three transistors 140 are schematically shown. The four signal lines 120 extend substantially along the first direction X, and are respectively disposed at the edge 1102 of the pixel 110, the boundary 1121 and the fourth side 1114, a place near the edge 1104 of the pixel 110, and the edge 1104 of the pixel 110. The two signal lines 130 extend substantially along the second direction Y, and are respectively disposed at the edge 1101 and the edge 1103 of the pixel 110. The transistors 140 are disposed corresponding to the display pixels 112R, 112G and 112B. The light shielding layer (not shown) is disposed corresponding to the signal lines 120, the signal lines 130 and the transistors 140.

In this embodiment, the signal line 120 is, for example, a scan line, and the signal line 130 is, for example, a data line, but the disclosure is not limited thereto. In this embodiment, the signal line 130 may have a branch 131 and a trunk 130*a*. A signal may be transmitted from the trunk 130*a* to the branch 131, and, for example, the branch 131 extends from the trunk 130*a* at the edge 1101 along the edge 1104 to the boundary 1122 of two display pixels, so that the branch 131 may be electrically connected to one of the display pixels 112R, 112G, and 112B (for example, to the display pixel 112B, but the disclosure is not limited thereto). In addition, the "pixel" in the disclosure may be defined by, for example, the trunks 130*a* of two adjacent signal lines 130 and two adjacent signal lines 120 electrically connected to the same color display pixel. For example, the two adjacent signal lines 120 are, for example, the signal line 120 electrically connected to the display pixel 112B in FIG. 2B and another signal line 120 at the top of FIG. 2B that may be electrically connected to a display pixel (not shown) that emits the same color as the display pixel 112B in another pixel, but the disclosure is not limited thereto.

Figure 3:
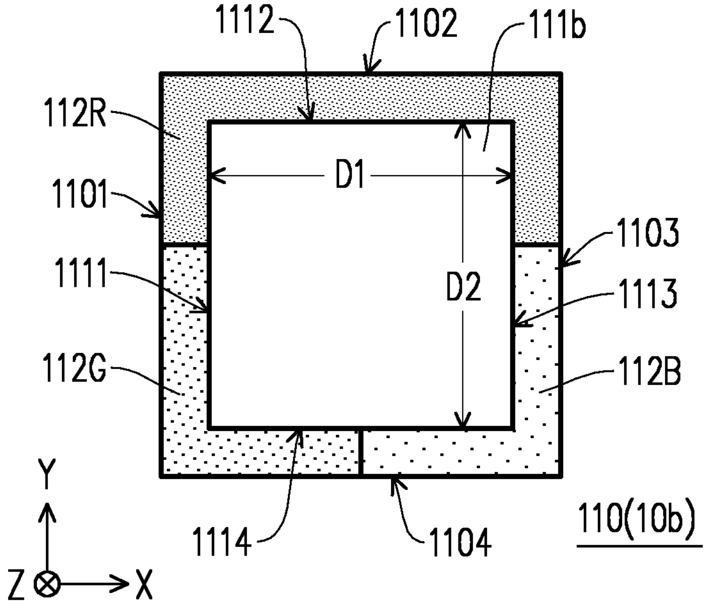
FIG. 3 is a schematic partial top view of a display device according to a second embodiment of the disclosure.

FIG. 3 is a schematic partial top view of a display device according to a second embodiment of the disclosure. Please refer to FIGS. 1B and 3 at the same time. The display device 10*b* of this embodiment is substantially similar to the display device 10 of FIG. 1B, so the same and similar components in the two embodiments will not be repeated here. FIG. 3 is a schematic top view of another embodiment of a pixel in the functional display area of FIG. 1A. The display device 10*b* of this embodiment is different from the display device 10 mainly in that, in the display device 10*b* of this embodiment, the white pixel 111*b* is disposed in the center of the pixel 110.

Specifically, with reference to FIG. 3, in this embodiment, multiple display pixels 112R, 112G, and 112B may be arranged in sequence and surround the first side 1111, the second side 1112, the third side 1113 and the fourth side 1114 of the white pixel 111*b*, for example, but the disclosure is not limited thereto. In some embodiments, the display pixel 112R, the display pixel 112G and the display pixel 112B may be arranged in other orders (or irregularly arranged) and surround the first side 1111, the second side 1112 and the third side 1113 and the fourth side 1114 of the white pixel 111*b*. In this embodiment, the multiple display pixels 112R, 112G and 112B may completely surround the white pixel 111*b*.

In this embodiment, since the distance D1 between the first side 1111 and the third side 1113 of the white pixel 111*b* may be substantially equal to the distance D2 between the second side 1112 and the fourth side 1114 of the white pixel 111*b*, the positions of the diffracted rays may be the same or the problem of serious diffraction in one direction may be reduced, which makes it easier for the software to correct the diffraction phenomenon caused by the light passing through the panel, so a better optical sensing effect may be obtained.

In this embodiment, the edges 1101, 1102, 1103 and 1104 of the pixel 110 and the edges of the white pixel 111*b* (that is, the first side 1111, the second side 1112, the third side 1113 and the fourth side 1114) are all straight lines; however, the disclosure does not limit the line forms of these edges. For example, in some embodiments, the edges 1101, 1102, 1103 and 1104 of the pixel 110 and the edges of the white pixel 111*b* (that is, the first side 1111, the second side 1112, the third side 1113 and the fourth side 1114) may be arcs (not shown).

Figure 4:
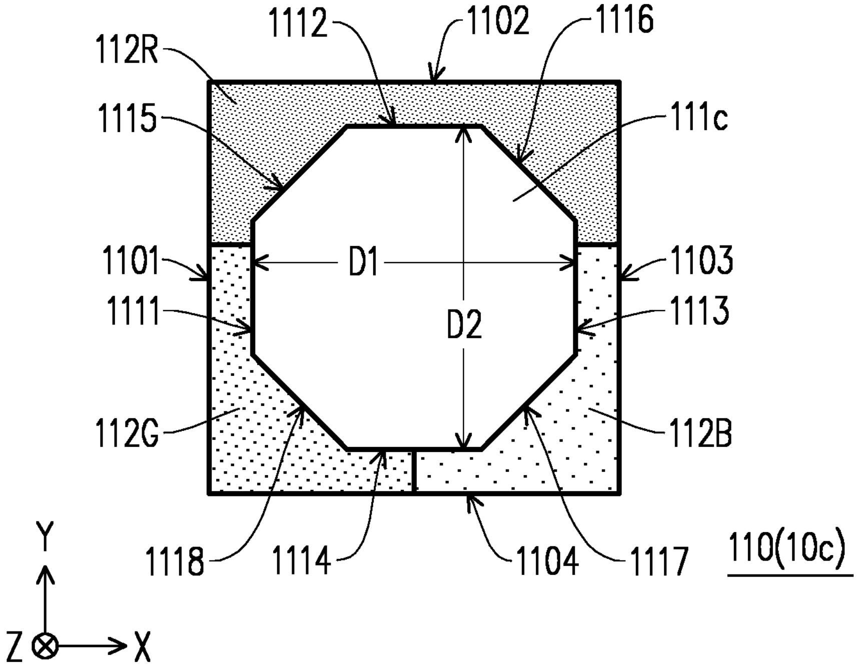
FIG. 4 is a schematic partial top view of a display device according to a third embodiment of the disclosure.
Figure 5A:
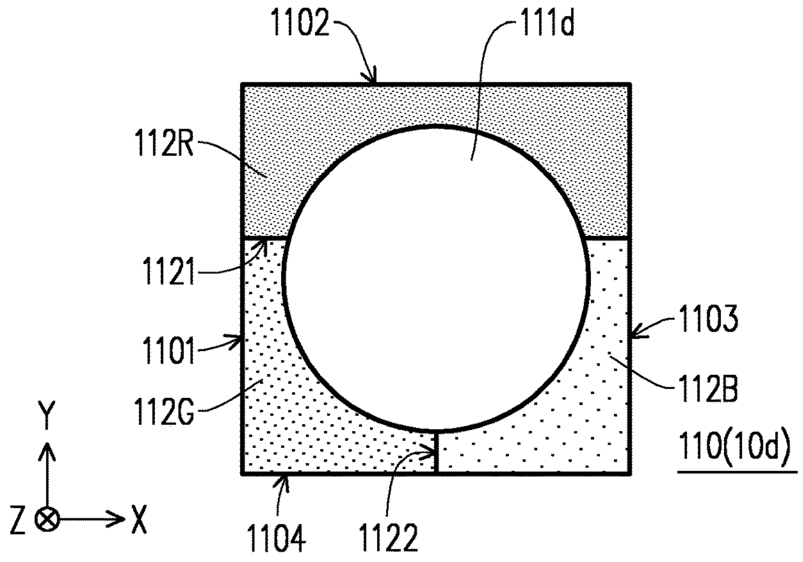
FIG. 5A is a schematic partial top view of a display device according to a fourth embodiment of the disclosure.
Figure 5B:
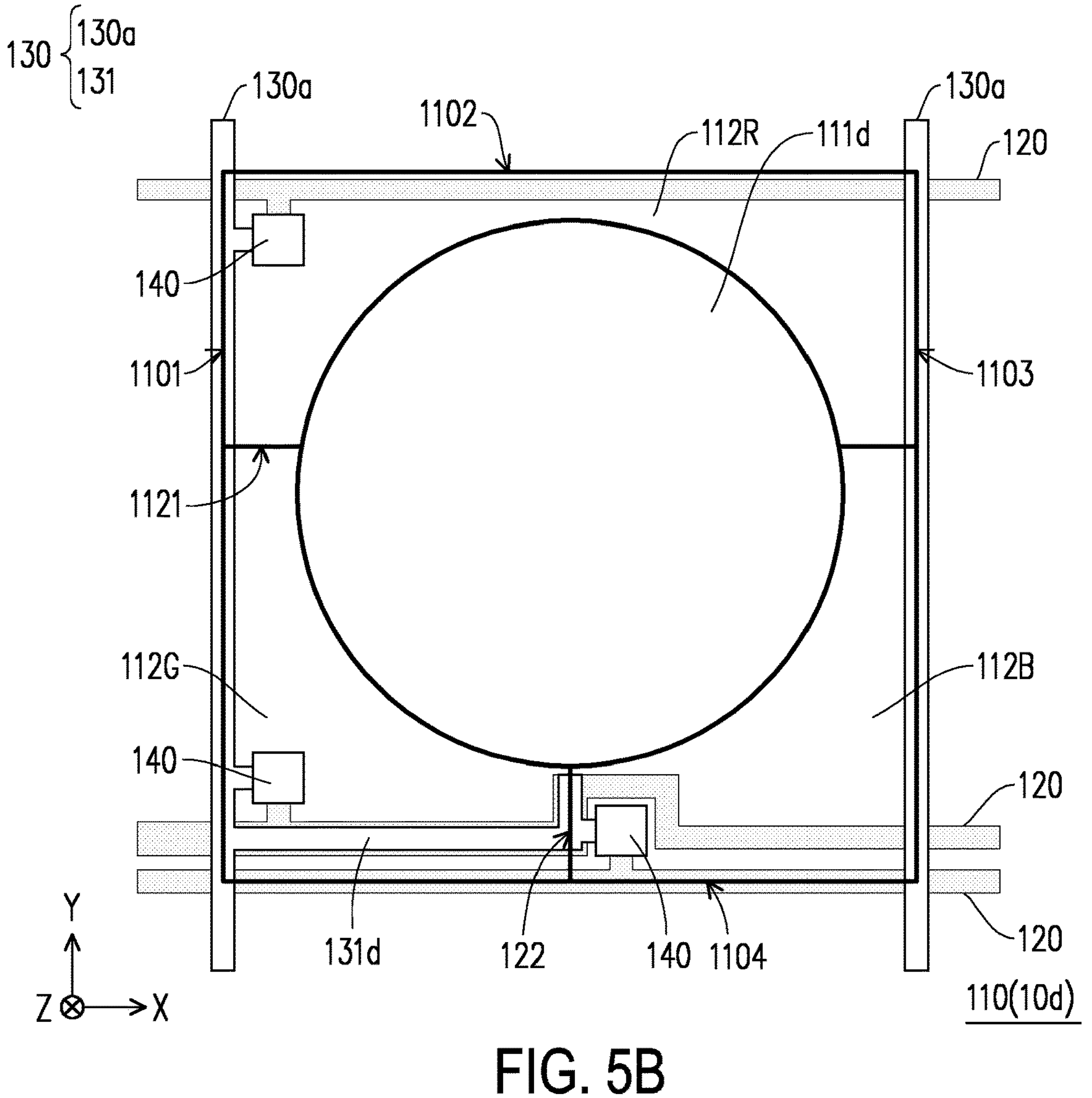
FIG. 5B is a schematic view of a circuit configuration of the display device of FIG. 5A.

In this embodiment, although the shape of the white pixel 111*b* is a square, the disclosure does not limit the shape of the white pixel 111*b*. For example, in some embodiments, the shape of the white pixel 111*c* may be an octagon (as shown in FIG. 4) or other polygons (not shown), as long as the distance D1 may be substantially equal to the distance D2 of the white pixel 111*c*. In some embodiments, the shape of the white pixel 111*d* may be a circle (as shown in FIGS. 5A and 5B). The measurement methods of the distance D1 and the distance D2 in this embodiment may be the same as those in the first embodiment, which will not be repeated here.

FIG. 4 is a schematic partial top view of a display device according to a third embodiment of the disclosure. Please refer to FIGS. 3 and 4 at the same time. The display device 10*c* of this embodiment is substantially similar to the display device 10*b* of FIG. 3, so the same and similar components in the two embodiments will not be repeated here. The display device 10*c* of this embodiment is different from the display device 10*b* mainly in that, in the display device 10*c* of this embodiment, the shape of the white pixel 111*c* is, for example, an octagon.

Specifically, with reference to FIG. 4, the white pixel 111*c* further has a fifth side 1115, a sixth side 1116, a seventh side 1117 and an eighth side 1118. The fifth side 1115 and the seventh side 1117 are opposite to each other, and the sixth side 1116 and the eighth side 1118 are opposite to each other. The fifth side 1115 connects the first side 1111 and the second side 1112; the sixth side 1116 connects the second side 1112 and the third side 1113; the seventh side 1117 connects the third side 1113 and the fourth side 1114; and the eighth side 1118 connects the fourth side 1114 and the first side 1111.

In this embodiment, since the distance D1 between the first side 1111 and the third side 1113 of the white pixel 111*c* may be substantially equal to the distance D2 between the second side 1112 and the fourth side 1114 of the white pixel 111*c*, the position of the diffracted rays may be the same or the problem of serious diffraction in one direction may be reduced, which makes it easier for the software to correct the diffraction phenomenon caused by the light passing through the panel, so a better optical sensing effect may be obtained. The measurement methods of the distance D1 and the distance D2 in this embodiment may be the same as those in the first embodiment, which will not be repeated here.

In this embodiment, the edges 1101, 1102, 1103 and 1104 of the pixel 110 and the edges of the white pixel 111*c* (that is, the first side 1111, the second side 1112, the third side 1113, the fourth side 1114, the fifth side 1115, the sixth side 1116, the seventh side 1117 and the eighth side 1118) are all straight lines; however, the disclosure does not limit the line forms of these edges. For example, in some embodiments, the edges 1101, 1102, 1103 and 1104 of the pixel 110 and the edges of the white pixel 111*b* (that is, the first side 1111, the second side 1112, the third side 1113, the fourth side 1114, the fifth side 1115, the sixth side 1116, the seventh side 1117 and the eighth side 1118) may be arcs (not shown).

FIG. 5A is a schematic partial top view of a display device according to a fourth embodiment of the disclosure. FIG. 5B is a schematic view of a circuit configuration of the display device of FIG. 5A. Please refer to FIGS. 3, 5A and 5B at the same time. The display device 10*d* of this embodiment is substantially similar to the display device 10*b* of FIG. 3, so the same and similar components in the two embodiments will not be repeated here. The display device 10*d* of this embodiment is different from the display device 10*b* mainly in that, in the display device 10*d* of this embodiment, the shape of the white pixel 111*d* is a circle.

Specifically, with reference to FIG. 5A, in this embodiment, since the shape of the white pixel 111*d* is a circle, the diameter of the white pixel 111*d* is equal or similar in all directions, and the positions of the diffracted rays are the same, which makes it easier for the software to correct the diffraction phenomenon caused by the light passing through the panel, so a better optical sensing effect may be obtained.

With reference to FIG. 5B, in this embodiment, the functional display area 100 further includes a signal line 120, a signal line 130, a transistor 140 and a light shielding layer (not shown). The signal line 120 and the signal line 130 may be electrically connected to the transistor 140, respectively, and the light shielding layer may be used to shield the signal line 120, the signal line 130 and the transistor 140. For example, as shown in FIG. 5B, three signal lines 120, two signal lines 130 and three transistors 140 are schematically shown. The three signal lines 120 extend substantially along the first direction X, and are respectively disposed at the edge 1102 of the pixel 110, a place near the edge 1104 of the pixel 110, and the edge 1104 of the pixel 110. The two signal lines 130 extend substantially along the second direction Y, and are respectively disposed at the edge 1101 and the edge 1103 of the pixel 110. The transistors 140 are disposed corresponding to the display pixels 112R, 112G and 112B. The light shielding layer (not shown) is disposed corresponding to the signal lines 120, the signal lines 130 and the transistors 140.

In this embodiment, the signal line 120 is, for example, a scan line, and the signal line 130 is, for example, a data line, but the disclosure is not limited thereto. In this embodiment, the signal line 130 may have a branch 131*d* and a trunk 130*a*. For example, the branch 131*d* extends from the signal line 130 at the edge 1101 to the boundary 1122 along the edge 1104, so that the branch 131*d* may be electrically connected to one of the display pixels 112R, 112G and 112B (for example, to the display pixel 112B), but the disclosure is not limited thereto.

In this embodiment, the edges 1101, 1102, 1103 and 1104 of the pixel 110 are all straight lines, but the disclosure does not limit the line forms of these edges. For example, in some embodiments, the edges 1101, 1102, 1103 and 1104 of the pixel 110 may be arcs (not shown).

Figure 6:
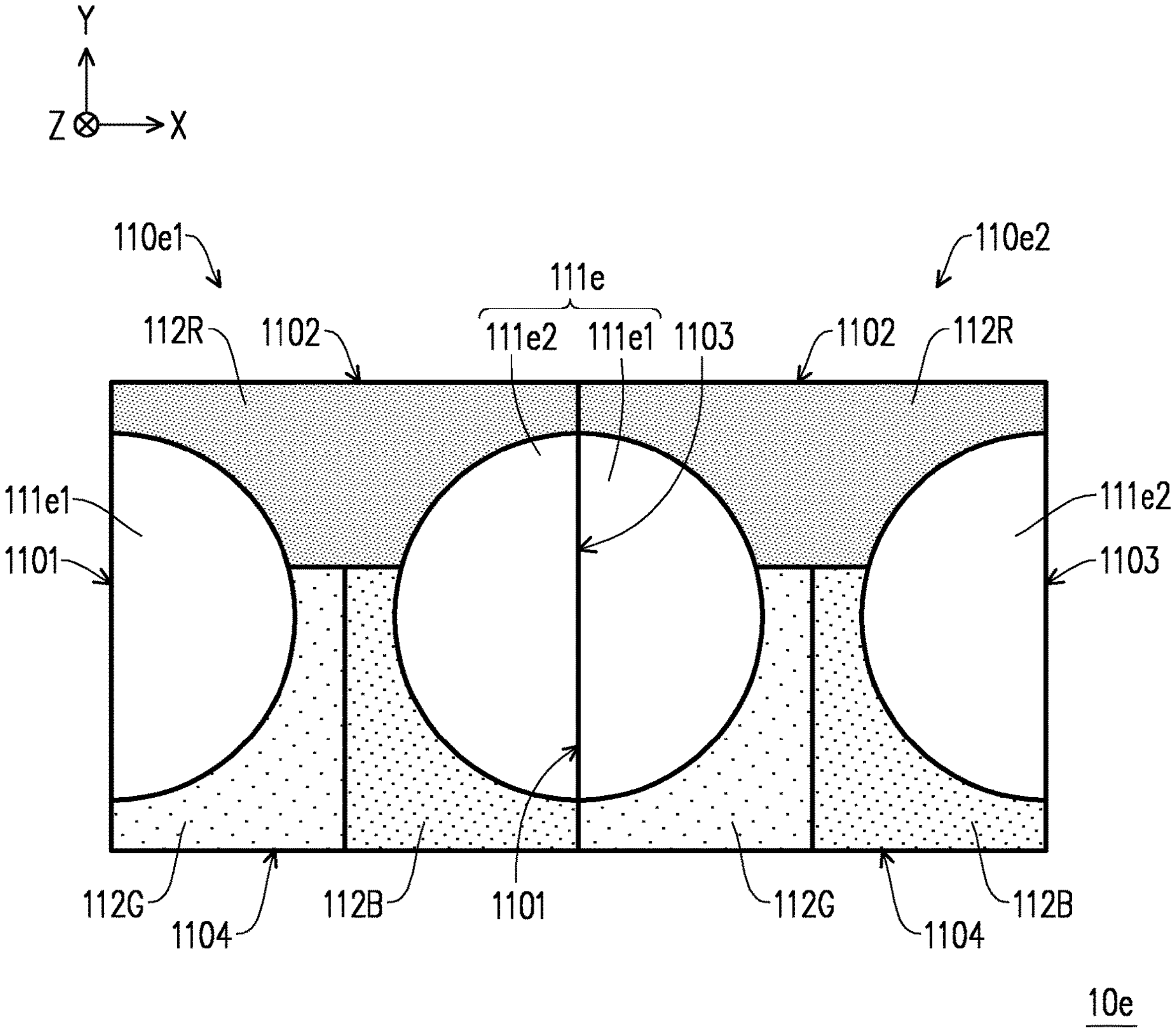
FIG. 6 is a schematic partial top view of a display device according to a fifth embodiment of the disclosure.

FIG. 6 is a schematic partial top view of a display device according to a fifth embodiment of the disclosure. Please refer to FIGS. 5A and 6 at the same time. The display device 10*e* of this embodiment is substantially similar to the display device 10*d* of FIG. 5A, so the same and similar components in the two embodiments will not be repeated here. The display device 10*e* of this embodiment is different from the display device 10*d* mainly in that, in the display device 10*e* of this embodiment, the white pixel 111*e* is disposed between the pixel 110*e*1 and the pixel 110*e*2.

Specifically, with reference to FIG. 6, in this embodiment, the pixels 110*e*1 and 110*e*2 include a white pixel 111*e*1, a white pixel 111*e*2 and multiple display pixels 112R, 112G and 112B. The white pixel 111*e*1 and the white pixel 111*e*2 are, for example, semi-circular, and are disposed adjacent to the edge 1101 and the edge 1103 of the pixels 110*e*1 and 110*e*2, respectively. The multiple display pixels 112R, 112G and 112B are arranged in sequence and disposed between the white pixel 111*e*1 and the white pixel 111*e*2, but the disclosure is not limited thereto. In some embodiments, the display pixel 112R, the display pixel 112G, and the display pixel 112B may be arranged in other orders (or irregularly arranged) and disposed between the white pixels 111*e*1 and 111*e*2.

In this embodiment, since the pixel 110*e*1 and the pixel 110*e*2 are disposed adjacent to each other, and there are no other pixels between the pixel 110*e*1 and the pixel 110*e*2, the white pixel 111*e*2 of the pixel 110*e*1 may be combined with the white pixel 111*e*1 of the pixel 110*e*2 to form the circular white pixel 111*e*. The circular white pixel 111*e* may be disposed in the center of the image after the pixel 110*e*1 and the pixel 110*e*2 are combined.

In this embodiment, the edges 1101, 1102, 1103 and 1104 of the pixels 110*e*1 and 110*e*2 are all straight lines, but the disclosure does not limit the line forms of these edges. For example, in some embodiments, the edges 1101, 1102, 1103 and 1104 of the pixels 110*e*1 and 110*e*2 may be arcs (not shown).

Figure 7:
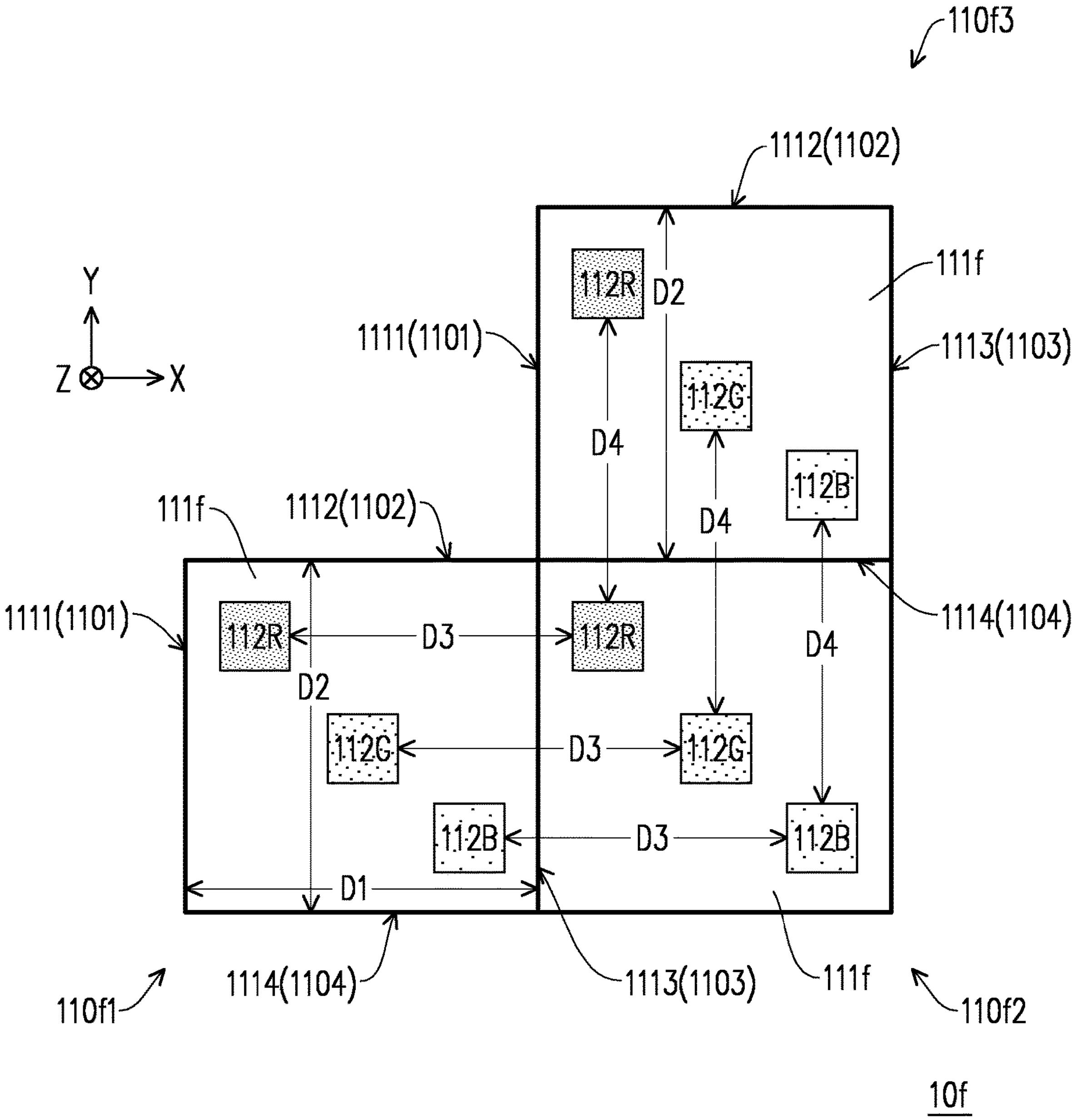
FIG. 7 is a schematic partial top view of a display device according to a sixth embodiment of the disclosure.

FIG. 7 is a schematic partial top view of a display device according to a sixth embodiment of the disclosure. Please refer to FIGS. 1B and 7 at the same time. The display device 10*f* of this embodiment is substantially similar to the display device 10 of FIG. 1B, so the same and similar components in the two embodiments will not be repeated here. The display device 10*f* of this embodiment is different from the display device 10 mainly in that, in the display device 10*f* of this embodiment, the multiple display pixels 112R, 112G and 112B of the pixels 110*f*1, 110*f*2 and 110*f*3 are disposed in the white pixel 111*f*.

Specifically, with reference to FIG. 7, in this embodiment, the pixel 110*f*1 is adjacent to the pixel 110*f*2, and the pixel 110*f*2 is adjacent to the pixel 110*f*3. That is, there are no other pixels between the pixel 110*f*1 and the pixel 110*f*2, and there are no other pixel between the pixel 110*f*2 and the pixel 110*f*3. In this embodiment, only three pixels are shown as an example. In other embodiments, more than three pixels adjacent to each other may be included, and the disclosure is not limited thereto.

In this embodiment, the first side 1111, the second side 1112, the third side 1113 and the fourth side 1114 of the white pixel 111*f* may be regarded as the edge 1101, the edge 1102, the edge 1103 and the edge 1104 of the pixels 110*f*1, 110*f*2 and 110*f*3. In this embodiment, the distance D1 between the first side 1111 and the third side 1113 of the white pixel 111*f* (that is, the length of the white pixel 111*f* in the first direction X) may be substantially equal to the distance between the edge 1101 and the edge 1103 of the pixels 110*f*1, 110*f*2, and 110*f*3 (that is, the length of the pixels 110*f*1, 110*f*2, 110*f*3 in the first direction X), and the distance D2 between the second side 1112 and the fourth side 1114 of the white pixel 111*f* (that is, the maximum length of the white pixel 111*f* in the second direction Y) may be substantially equal to the distance between the edge 1102 and the edge 1104 of the pixels 110*f*1, 110*f*2 and 110*f*3 (that is, the maximum length of the pixels 110*f*1, 110*f*2 and 110*f*3 in the second direction Y). Therefore, the display device 10*f* of this embodiment may reduce the problem of diffraction or have a better optical sensing effect. The distance between the edge 1101 and the edge 1103 is, for example, the maximum distance measured along the first direction X between the edge 1101 and the edge 1103, and the distance between the edge 1102 and the edge 1104 is, for example, the maximum distance measured along the second direction Y between the edge 1102 and the edge 1104.

In this embodiment, the multiple display pixels 112R, 112G and 112B may, for example, be sequentially dispersed and arranged in the white pixel 111*f*, but the disclosure is not limited thereto. In some embodiments, the display pixel 112R, the display pixel 112G, and the display pixel 112B may be dispersed and arranged in other orders (or irregularly dispersed and arranged) in the white pixel 111*f*. The multiple display pixels 112R, 112G and 112B may be separated from each other. The display pixel 112R may not overlap the display pixel 112G and the display pixel 112B in the first direction X and the second direction Y. The display pixel 112G may not overlap the display pixel 112R and the display pixel 112B in the first direction X and the second direction Y. The display pixel 112B may not overlap the display pixel 112R and the display pixel 112G in the first direction X and the second direction Y. The above configuration may enable the display device 10*f* of this embodiment to reduce the problem of diffraction or have a better optical sensing effect.

In this embodiment, the display pixel 112R (or the display pixel 112G or the display pixel 112B) of the pixel 110*f*1 and the display pixel 112R (or the display pixel 112G or the display pixel 112B) of the pixel 110*f*2 are arranged adjacent to each other in the first direction X between the adjacent pixels 110*f*1 and 110*f*2, and there are no other display pixels between the display pixel 112R (or the display pixel 112G or the display pixel 112B) of the pixel 110*f*1 and the display pixel 112R (or the display pixel 112G or the display pixel 112B) of the pixel 110*f*2.

The display pixel 112R (or the display pixel 112G or the display pixel 112B) of the pixel 110*f*1 may overlap the display pixel 112R (or the display pixel 112G or the display pixel 112B) of the pixel 110*f*2 in the first direction X. The distance D3 between the display pixel 112R (or the display pixel 112G or the display pixel 112B) of the pixel 110*f*1 and the display pixel 112R (or the display pixel 112G or the display pixel 112B) of the pixel 110*f*2 may be, for example, greater than or equal to ⅕ of the distance D1 and less than or equal to ⅘ of the distance D1 (that is, $\frac{1}{5}\times D1 \leq D3 \leq \frac{4}{5}\times D1$), but the disclosure is not limited thereto. The distance D3 is, for example, the minimum distance measured along the first direction X between the display pixel 112R (or the display pixel 112G or the display pixel 112B) of the pixel 110*f*1 and the display pixel 112R (or the display pixel 112G or the display pixel 112B) of the pixel 110*f*2.

In this embodiment, the display pixel 112R (or the display pixel 112G or the display pixel 112B) of the pixel 110*f*2 and the display pixel 112R (or the display pixel 112G or the display pixel 112B) of the pixel 110*f*3 are arranged adjacent to each other in the second direction Y between the adjacent pixels 110*f*2 and 110*f*3, and there are no other display pixels between the display pixel 112R (or the display pixel 112G or the display pixel 112B) of the pixel 110*f*2 and the display pixel 112R (or the display pixel 112G or the display pixel 112B) of the pixel 110*f*3. The display pixel 112R (or the display pixel 112G or the display pixel 112B) of the pixel 110*f*2 may overlap the display pixel 112R (or the display pixel 112G or the display pixel 112B) of the pixel 110*f*2 in the second direction Y. The distance D4 between the display pixel 112R (or the display pixel 112G or the display pixel 112B) of the pixel 110*f*2 and the display pixel 112R (or the display pixel 112G or the display pixel 112B) of the pixel 110*f*3 may be, for example, greater than or equal to ⅕ of the distance D2 and less than or equal to ⅘ of the distance D2 (that is, $\frac{1}{5}\times D2 \leq D4 \leq \frac{4}{5}\times D2$), but the disclosure is not limited thereto. The distance D4 is, for example, the minimum distance measured along the second direction Y between the display pixel 112R (or the display pixel 112G or the display pixel 112B) of the pixel 110*f*2 and the display pixel 112R (or the display pixel 112G or the display pixel 112B) of the pixel 110*f*3.

In this embodiment, the edges 1101, 1102, 1103 and 1104 of the pixels 110*f*1, 110*f*2 and 110*f*3 and the edges of the white pixel 111*f* (that is, the first side 1111, the second side 1112, the third side 1113 and the fourth side 1114) are all straight lines; however, the disclosure does not limit the line forms of these edges. For example, in some embodiments, the edges 1101, 1102, 1103 and 1104 of the pixels 110*f*1, 110*f*2 and 110*f*3 and the edges of the white pixel 111*f* (that is, the first side 1111, the second side 1112, the third side 1113 and the fourth side 1114) may be arcs (not shown).

In this embodiment, the multiple display pixels 112R, 112G and 112B in the white pixel 111*f* are arranged in the order of the display pixel 112R, the display pixel 112G and the display pixel 112B in the first direction X, and are arranged in the order of the display pixel 112R, the display pixel 112G and the display pixel 112B in the second direction Y, but the disclosure does not limit the arrangement order of the multiple display pixels 112R, 112G and 112B. Any arrangement order may be adopted as long as the display pixel 112R may not overlap the display pixel 112G and the display pixel 112B in the first direction X and the second direction Y, and the display pixel 112G may not overlap the display pixel 112R and the display pixel 112B in the first direction X and the second direction Y, and the display pixel 112B may not overlap the display pixel 112R and the display pixel 112G in the first direction X and the second direction Y.

Figure 8:
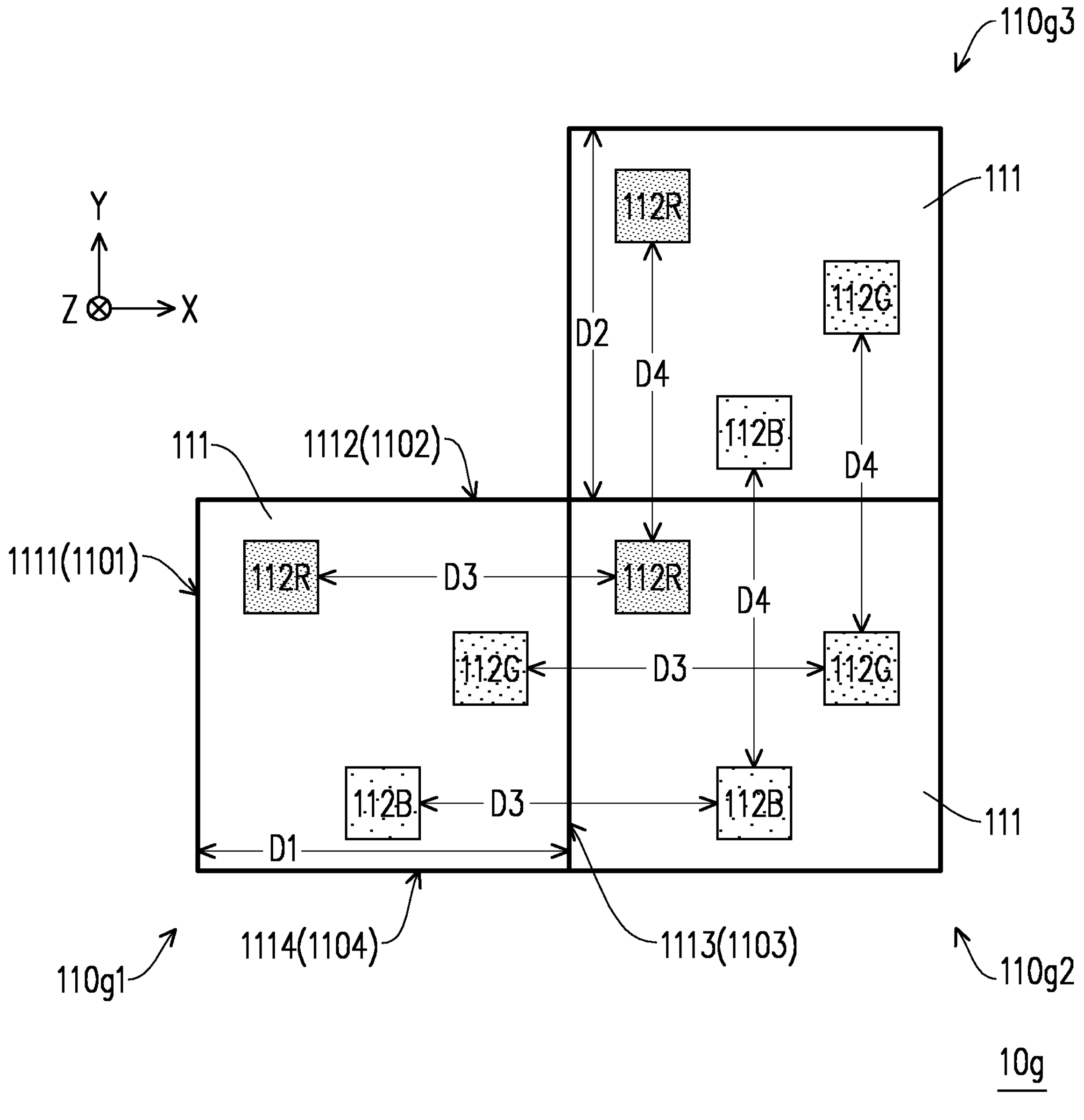
FIG. 8 is a schematic partial top view of a display device according to a seventh embodiment of the disclosure.

FIG. 8 is a schematic partial top view of a display device according to a seventh embodiment of the disclosure. Please refer to FIGS. 7 and 8 at the same time. The display device 10*g* of this embodiment is substantially similar to the display device 10*f* of FIG. 7, so the same and similar components in the two embodiments will not be repeated here. The display device 10*g* of this embodiment is different from the display device 10*f* mainly in that, in the display device 10*g* of this embodiment, the multiple display pixels 112R, 112G and 112B disposed in the white pixels 111 of the pixels 110*g*1, 110*g*2, and 110*g*3 have different configurations.

Specifically, with reference to FIG. 8, in this embodiment, the arrangement order of the multiple display pixels 112R, 112G and 112B in the first direction X is the display pixel 112R, the display pixel 112B, and the display pixel 112G, which is different from the arrangement order of the multiple display pixels 112R, 112G and 112B in the first direction X in FIG. 7 (that is, the display pixel 112R, the display pixel 112G, and the display pixel 112B).

In this embodiment, the arrangement order of the multiple display pixels 112R, 112G and 112B in the second direction Y is the display pixel 112R, the display pixel 112G, and the display pixel 112B, which is the same as the arrangement order of the multiple display pixels 112R, 112G and 112B in the first direction X in FIG. 7 (that is, the display pixel 112R, the display pixel 112G, and the display pixel 112B).

Figure 9:
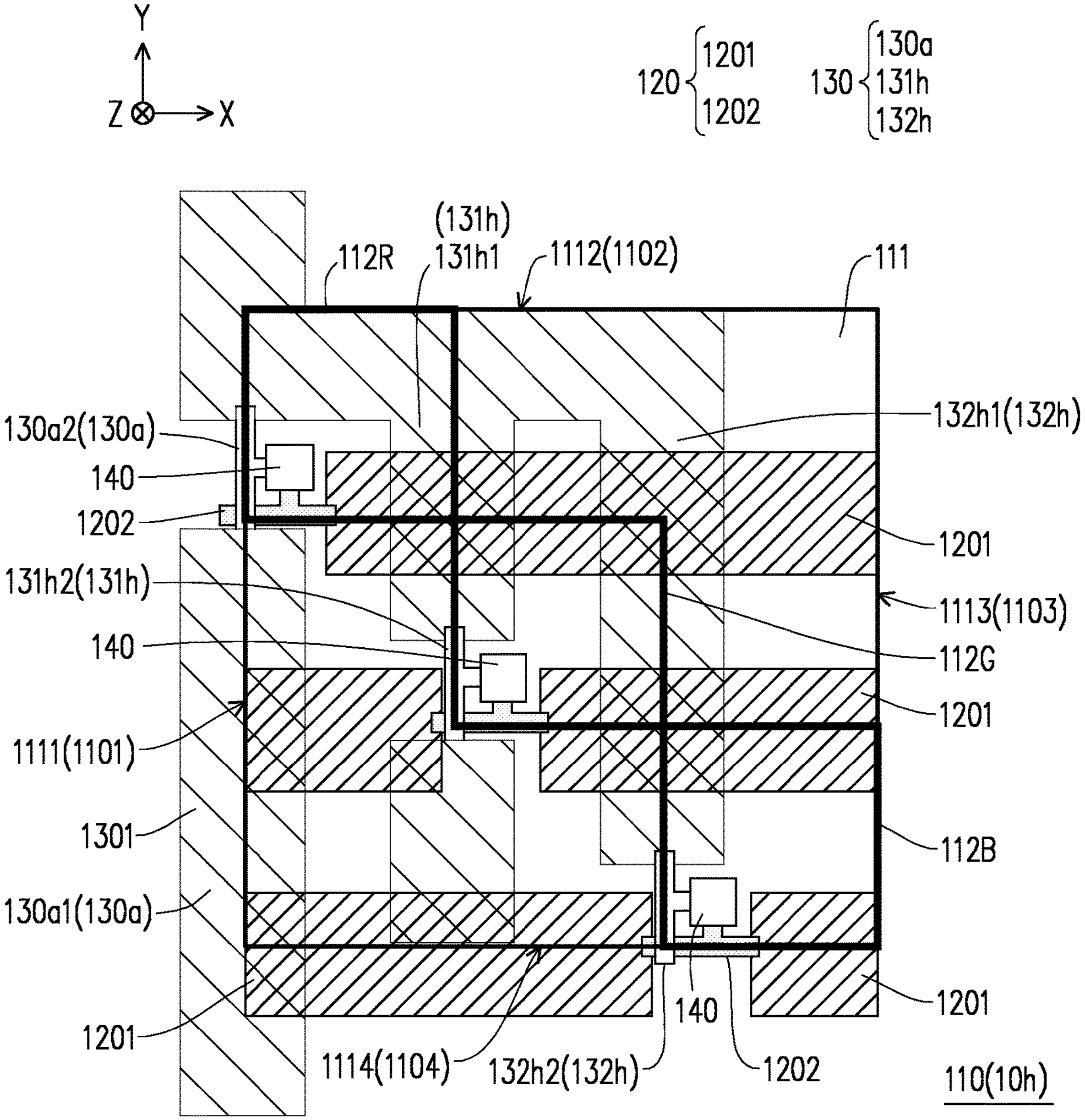
FIG. 9 is a schematic partial top view and a schematic view of a circuit configuration of a display device according to an eighth embodiment of the disclosure.

FIG. 9 is a schematic partial top view and a schematic view of a circuit configuration of a display device according to an eighth embodiment of the disclosure. Please refer to FIGS. 7 and 9 at the same time. The display device 10*h* of this embodiment is substantially similar to the display device 10*f* of FIG. 7, so the same and similar components in the two embodiments will not be repeated here. The display device 10*h* of this embodiment is different from the display device 10*f* mainly in that, in the display device 10*h* of this embodiment, the multiple display pixels 112R, 112G and 112B disposed in the white pixel 111 of the pixel 110 are connected together.

Specifically, with reference to FIG. 9, in this embodiment, the functional display area 100 further includes a signal line 120, a signal line 130, a transistor 140 and a light shielding layer (not shown). The signal line 120 and the signal line 130 may be electrically connected to the transistor 140, respectively, and the light shielding layer may be used to shield part of the signal line 120, part of the signal line 130 and the transistor 140. For example, as shown in FIG. 9, three signal lines 120, one signal line 130 and three transistors 140 are schematically shown. The signal line 120 is, for example, a scan line, and the signal line 130 is, for example, a data line, but the disclosure is not limited thereto. The three signal lines 120 extend substantially along the first direction X, and are respectively disposed at the lower edge of the display pixel 112R, the lower edge of the display pixel 112G, and the lower edge of the display pixel 112B. The signal line 130 extends substantially along the second direction Y, and is disposed at the left side of the display pixel 112R. The signal line 130 may include a trunk 130*a*, a branch 131*h*, and a branch 132*h*. The branch 131*h*, for example, extends from the signal line 130 at the left side of the display pixel 112R along the edge 1102 to the left side of the display pixel 112G. The branch 132*h*, for example, extends from the signal line 130 at the left side of the display pixel 112R along the edge 1102 to the left side of display pixel 112B. In this way, the branch 131*h* and the branch 132*h* may be electrically connected to one of the multiple display pixels 112R, 112G and 112B, respectively (for example, to the display pixel 112G or the display pixel 112B, but the disclosure is not limited thereto). The transistors 140 are disposed corresponding to the display pixels 112R, 112G and 112B.

In this embodiment, the signal line 120 may be divided into a signal line 1201 and a signal line 1202 according to the materials used. The trunk 130*a* of the signal line 130 may be divided into a trunk 130*a*1 and a trunk 130*a*2 according to the materials used, and the branch 131*h* (or the branch 132*h*) of the signal line 130 may also be divided into a branch 131*h*1 (or a branch 132*h*1) and a branch 131*h*2 (or a branch 132*h*2) according to the materials used. The materials of the signal line 1201, the trunk 130*a*1, the branch 131*h*1 and the branch 132*h*1 include transparent conductive materials (such as indium tin oxide, indium zinc oxide, indium oxide, zinc oxide, tin oxide, other suitable materials, or a combination of the above, but the disclosure is not limited thereto). The materials of the signal line 1202, the trunk 130*a*2, the branch 131*h*2, and the branch 132*h*2 include metals (for example, aluminum, molybdenum, copper, silver, other suitable materials, or a combination of the above, but the disclosure is not limited thereto). The signal line 1202, the trunk 130*a*2, the branch 131*h*2, and the branch 132*h*2 are adjacent to the transistor 140. The light shielding layer (not shown) may be disposed corresponding to the signal line 1202, the trunk 130*a*2, the branch 131*h*2, the branch 132*h*2 and the transistor 140, but the disclosure is not limited thereto.

Figure 10A:
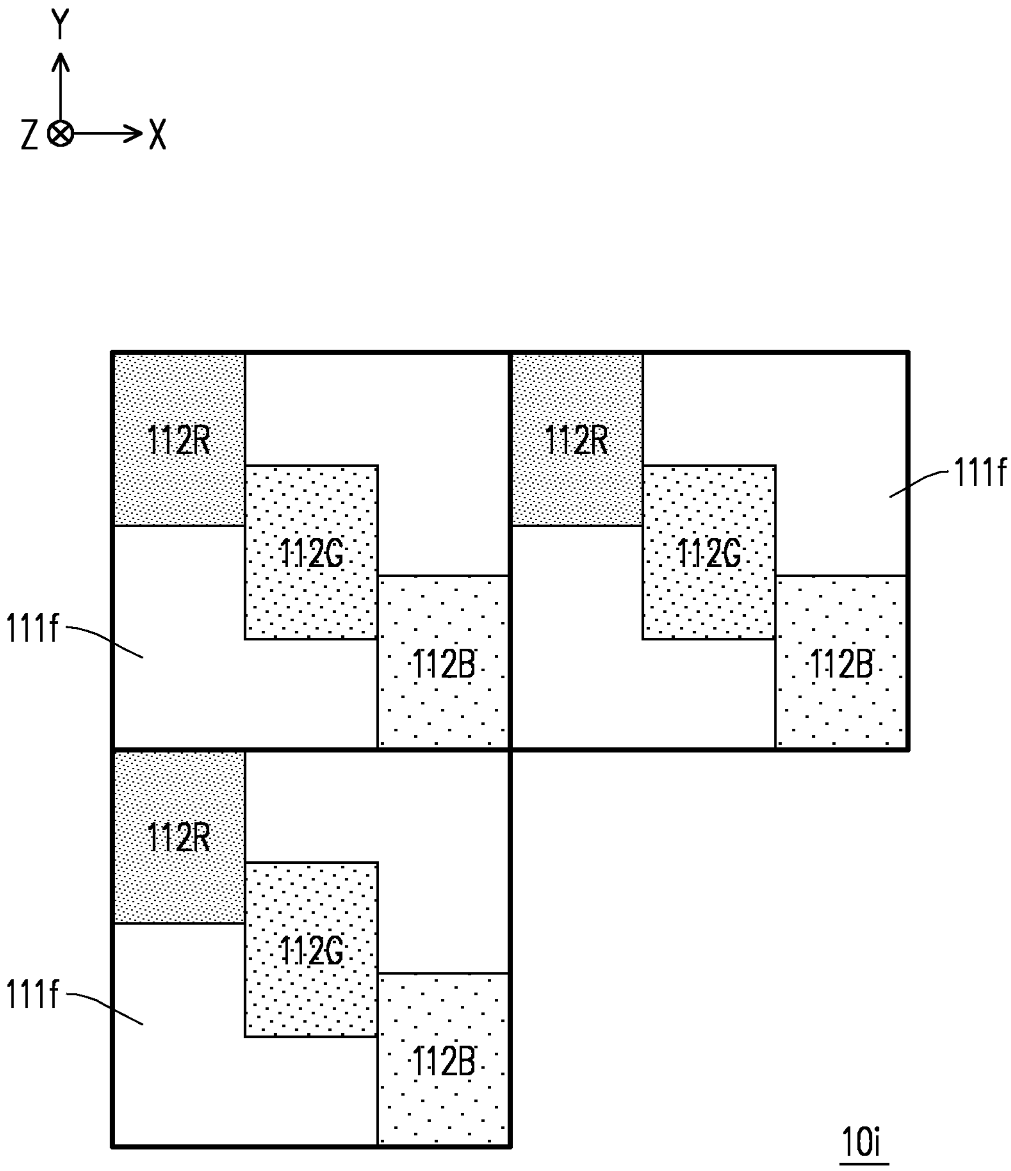
FIG. 10A and FIG. 10B are schematic partial top views of a display device according to a ninth embodiment of the disclosure.
Figure 10B:
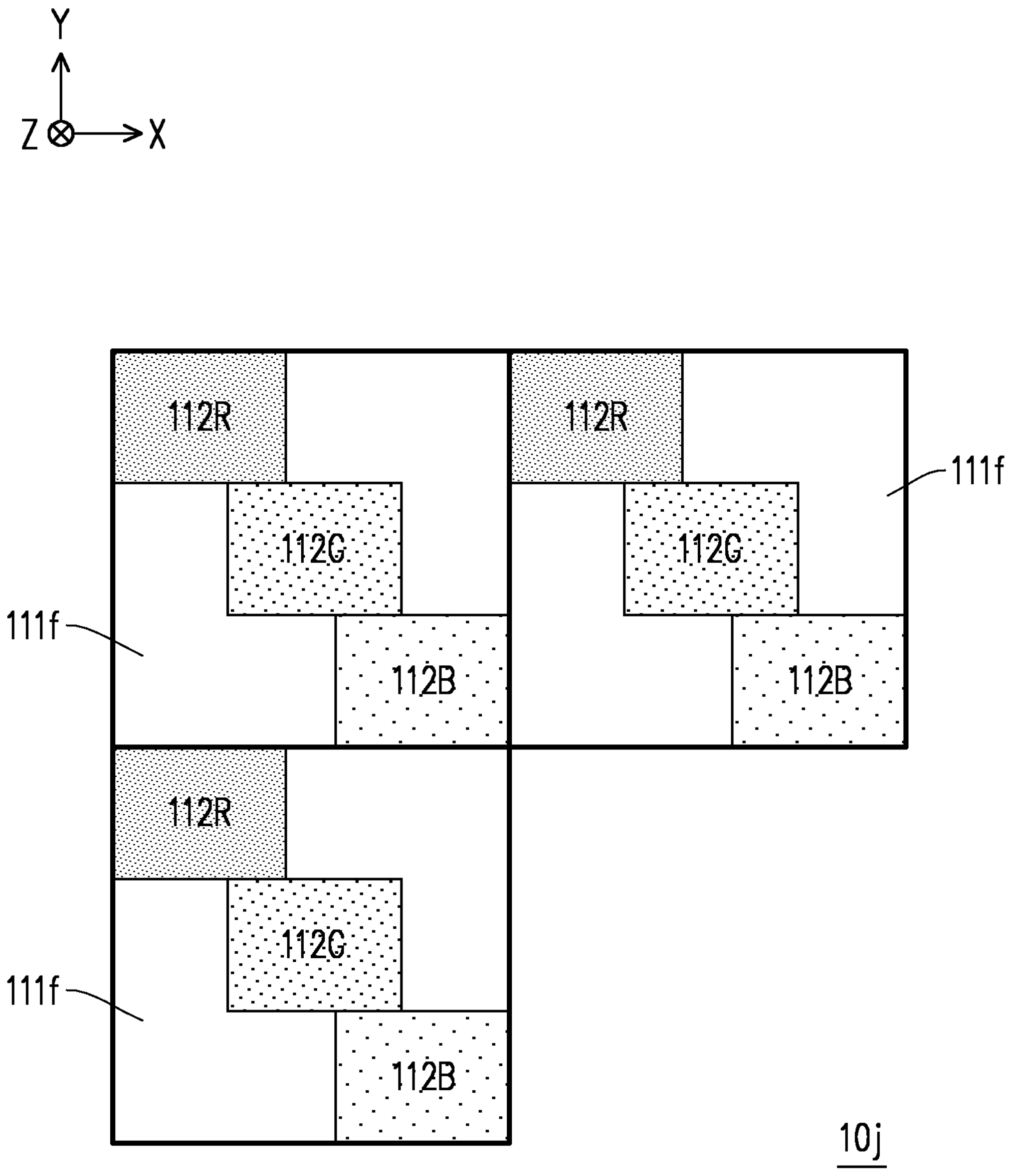

FIG. 10A and FIG. 10B are schematic partial top views of a display device according to a ninth embodiment of the disclosure. Please refer to FIGS. 7, 10A and 10B at the same time. The display device 10*i* and the display device 10*j* of the embodiments are substantially similar to the display device 10*f* of FIG. 7, so the same and similar components in the two embodiments will not be repeated here.

The display device 10*i* of this embodiment is different from the display device 10*f* mainly in that, in the display device 10*i* of this embodiment, the display pixel 112R may not overlap the display pixel 112G and the display pixel 112B in the second direction Y, and the display pixel 112R may partially overlap the display pixel 112G in the first direction X. The display pixel 112G may not overlap the display pixel 112R and the display pixel 112B in the second direction Y, and the display pixel 112G may partially overlap the display pixel 112R and/or the display pixel 112B in the first direction X. The display pixel 112B may not overlap the display pixel 112R and the display pixel 112G in the second direction Y, and the display pixel 112B may partially overlap the display pixel 112G in the first direction X.

The display device 10*j* of this embodiment is different from the display device 10*f* mainly in that, in the display device 10*j* of this embodiment, the display pixel 112R may not overlap the display pixel 112G and the display pixel 112B in the first direction X, and the display pixel 112R may partially overlap the display pixel 112G in the second direction Y. The display pixel 112G may not overlap the display pixel 112R and the display pixel 112B in the first direction X, and the display pixel 112G may partially overlap the display pixel 112R and/or the display pixel 112B in the second direction Y. The display pixel 112B may not overlap the display pixel 112R and the display pixel 112G in the first direction X, and the display pixel 112B may partially overlap the display pixel 112G in the second direction Y. The configuration in this embodiment may enable the display device 10*f* of this embodiment to reduce the problem of diffraction or have a better optical sensing effect.

Figure 11:
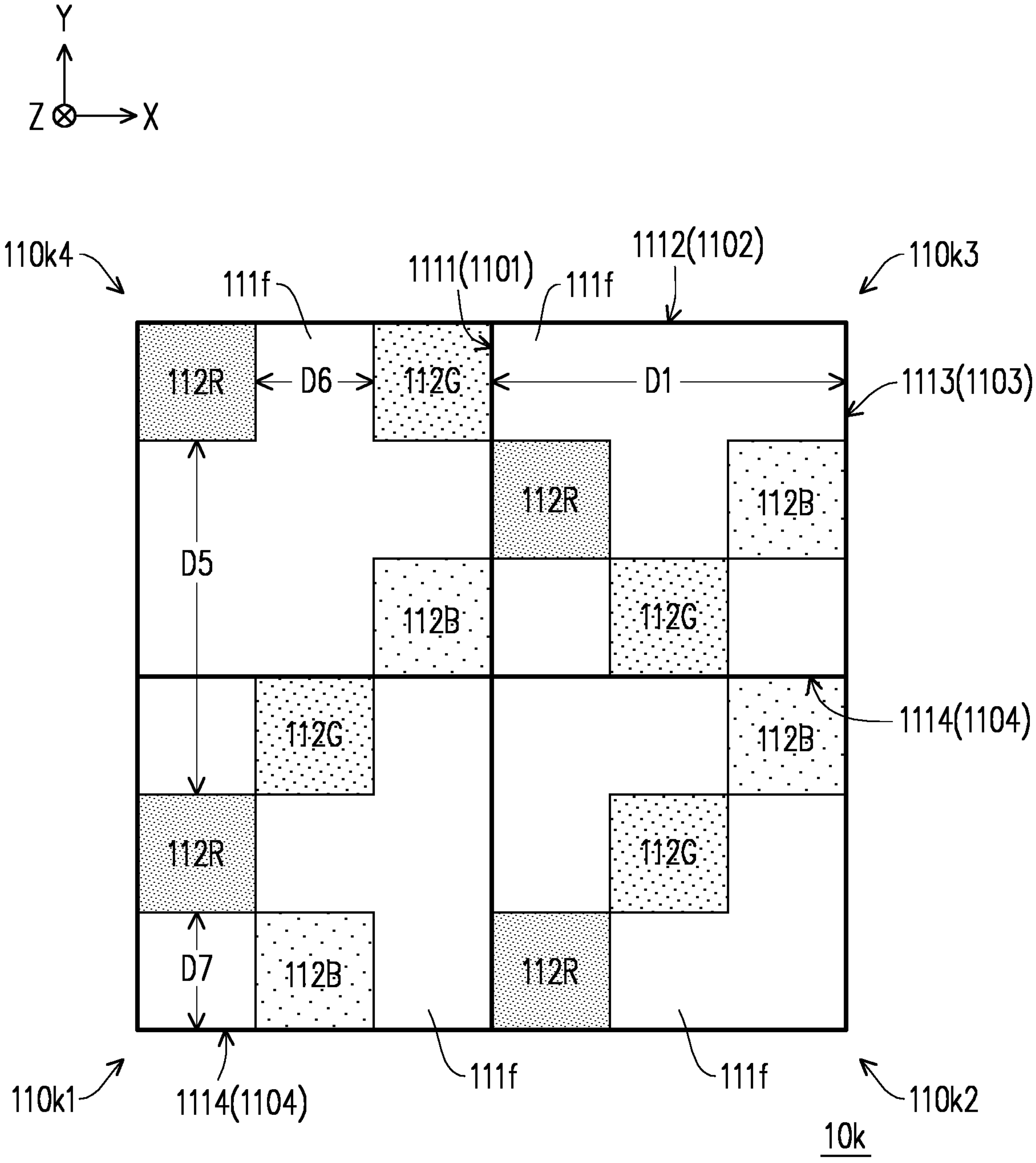
FIG. 11 is a schematic partial top view of a display device according to a tenth embodiment of the disclosure.

FIG. 11 is a schematic partial top view of a display device according to a tenth embodiment of the disclosure. Please refer to FIGS. 7 and 11 at the same time. The display device 10*k* of this embodiment is substantially similar to the display device 10*f* of FIG. 7, so the same and similar components in the two embodiments will not be repeated here. The display device 10*k* of this embodiment is different from the display device 10*f* mainly in that there are two pixel pitches in the first direction X and the second direction Y respectively.

For example, with reference to FIG. 11, in the display device 10*k* of this embodiment, the pixel 110*k*1, the pixel 110*k*2, the pixel 110*k*3, and the pixel 110*k*4 may be a pixel group, and the pixel group may be repeatedly arranged along the first direction X and the second direction Y. In the pixel group, the display pixels in the first direction X and the second direction Y may have two pixel pitches. Specifically, the display pixel 112R in the pixel 110*k*4 and the display pixel 112R in the pixel 110*k*1 have a minimum distance D5 in the second direction Y, and the display pixel 112R in the pixel 110*k*1 and a display pixel of another adjacent pixel in the second direction Y (not shown, for example, a pixel of the same configuration as the pixel 110*k*4) have a minimum distance D7 in the second direction Y. Therefore, the display pixels may have two pixel pitches in the second direction Y. With continual reference to FIG. 11, the display pixel 112R and the display pixel 112G in the pixel 110*k*4 have a minimum distance D6 in the first direction X, and the display pixel 112G in the pixel 110*k*4 and a display pixel of another adjacent pixel in the first direction X (not shown, for example, a pixel of the same configuration as the pixel 110*k*4) have a minimum distance D1 in the first direction X. Therefore, the display pixels may have two pixel pitches in the first direction X.

In this embodiment, the distance D1 between the first side 1111 and the third side 1113 of the white pixel 111*f* (that is, the length of the white pixel 111*f* in the first direction X) may be substantially equal to the distance between the edge 1101 and the edge 1103 of the pixels 110*k*1, 110*k*2, 110*k*3 and 110*k*4 (that is, the length of the pixels 110*k*1, 110*k*2, 110*k*3 and 110*k*4 in the first direction X), and the distance D5 between the display pixel 112R of the pixel 110*k*4 (or the display pixel 112R of the pixel 110*k*3) and the display pixel 112R of the pixel 110*k*1 (or the display pixel 112R of the pixel 110*k*2) may be substantially equal to the distance between the edge 1102 and the edge 1104 of the pixels 110*k*1, 110*k*2, 110*k*3 and 110*k*4 (that is, the maximum length of the pixels 110*k*1, 110*k*2, 110*k*3 and 110*k*4 in the second direction Y). Therefore, the display device 10*k* of this embodiment may reduce the problem of diffraction or have a better optical sensing effect.

In this embodiment, the distance D6 between the display pixel 112R and the display pixel 112G of the pixel 110*k*4 may be, for example, less than the distance D1. For example, the distance D6 is substantially equal to ⅓ of the distance D1 (that is, D6≈⅓×D1), but the disclosure is not limited thereto.

In this embodiment, the distance D7 between the display pixel 112R of the pixel 110*k*1 and the fourth side 1114 of the white pixel 111*f* (or the edge 1104 of the pixel 110*k*1) may be, for example, less than the distance D5. For example, the distance D7 is substantially equal to ⅓ of the distance D5 (that is, D7≈⅓×D5), but the disclosure is not limited thereto.

In summary, in the display devices of the embodiments of the disclosure, since the distance between the first side and the third side of the white pixel (that is, the length of the white pixel in the first direction) may be substantially equal to the distance between the second side and the fourth side of the white pixel (that is, the length of the white pixel in the second direction), the positions of the diffracted rays may be the same or the problem of serious diffraction in one direction may be reduced, which makes it easier for the software to correct the diffraction phenomenon caused by the light passing through the panel, so a better optical sensing effect may be obtained. In the display device of some embodiments, since the line form of the pixel is designed as an arc, the diffraction of light in the first direction X or the second direction Y may be further reduced. In the display device of some embodiments, since the shape of the white pixel is a circle, the diameter of the white pixel is equal or similar in all directions, and the positions of the diffracted rays are the same, which makes it easier for the software to correct the diffraction phenomenon caused by the light passing through the panel, so a better optical sensing effect may be obtained. In the display device of some embodiments, the distance between the first side and the third side of the white pixel (that is, the length of the white pixel in the first direction) may be substantially equal to the length of the pixel in the first direction), and the distance between the second side and the fourth side of the white pixel (that is, the length of the white pixel in the second direction) may be substantially equal to the length of the pixel in the second direction Y. Therefore, the problem of diffraction may be reduced, or a better optical sensing effect may be achieved.

In the end, it should be noted that the above embodiments are only used to describe the technical solutions of the disclosure rather than to limit the disclosure. Although the disclosure has been described in detail with reference to the foregoing embodiments, those skilled in the art should understand that combinations or modifications to the technical solutions described in the foregoing embodiments may be made, or some or all of the technical features therein may be replaced with equivalents; however, such combinations, modifications or replacements do not cause the spirit of the corresponding technical solutions to depart from the scope of the technical solutions of the embodiments of the disclosure.

What is claimed is:

1. A display device, comprising a display panel, wherein the display panel has a functional display area, and the functional display area comprises:
- a pixel, comprising a white pixel and a plurality of display pixels,
- wherein the plurality of display pixels are around at least a part of the white pixel, and the white pixel comprises a pixel electrode,
- wherein the plurality of display pixels are disposed within the white pixel.

2. The display device according to claim 1, wherein a transmittance of the functional display area in a sensing mode is greater than the transmittance of the functional display area in a non-sensing mode.

3. The display device according to claim 1, further comprising:

a camera, disposed corresponding to the functional display area.

4. The display device according to claim 3, wherein an area of the functional display area is greater than an area of the camera.

5. The display device according to claim 1, wherein a maximum length of the white pixel in a first direction is equal to a maximum length of the white pixel in a second direction, and the first direction is perpendicular to the second direction.

6. The display device according to claim 1, wherein when the functional display area is displaying an image, the white pixel does not display an image or presents a black image.

7. The display device according to claim 1, wherein the white pixel comprises a first white pixel and a second white pixel which are separated from each other.

8. The display device according to claim 7, wherein the functional display area further comprises:

another pixel, disposed adjacent to the pixel and comprising another white pixel and another plurality of display pixels, wherein the second white pixel is combined with another first white pixel of the another white pixel to form a shape.

9. A display device, comprising a display panel, wherein the display panel has a functional display area, and the functional display area comprises:

a pixel, comprising a white pixel and a plurality of display pixels; and a signal line, comprising a branch, wherein the branch is electrically connected to one of the plurality of display pixels, wherein the plurality of display pixels are disposed within the white pixel.

10. The display device according to claim 9, wherein a material of the signal line comprises a transparent conductive material.

11. The display device according to claim 9, wherein the signal line is a data line.

12. The display device according to claim 9, wherein a length of the white pixel in a first direction is equal to a length of the pixel in the first direction, a length of the white pixel in a second direction is equal to a length of the pixel in the second direction, and the first direction is perpendicular to the second direction.

13. The display device according to claim 9, wherein the signal line is disposed at an edge of the pixel and/or at a boundary between the white pixel and the plurality of display pixels.

14. The display device according to claim 9, wherein the plurality of display pixels comprise a first display pixel, a second display pixel and a third display pixel, the first display pixel does not overlap the second display pixel and the third display pixel in a first direction and a second direction, and the second display pixel does not overlap the third display pixel in the first direction and the second direction.

15. The display device according to claim 14, wherein the functional display area further comprises:

another pixel, disposed adjacent to the pixel and comprising another white pixel and another plurality of display pixels, wherein a distance between the first display pixel and another first display pixel of the another plurality of display pixels is greater than or equal to $\frac{1}{5}$ of a length of the white pixel in the first direction, and less than or equal to $\frac{4}{5}$ of the length.

* * * * *